(12) United States Patent
Malkamaki et al.

(10) Patent No.: US 8,320,341 B2
(45) Date of Patent: Nov. 27, 2012

(54) RE-TRANSMISSION CAPABILITY IN SEMI-PERSISTENT TRANSMISSION

(75) Inventors: Esa M. Malkamaki, Espoo (FI); Jussi K. Ojala, Helsinki (FI); Jari Petteri Lunden, Espoo (FI)

(73) Assignee: Nokia Corporation, Espoo (FI)

( * ) Notice: Subject to any disclaimer, the term of this patent is extended or adjusted under 35 U.S.C. 154(b) by 908 days.

(21) Appl. No.: 12/288,786

(22) Filed: Oct. 23, 2008

(65) Prior Publication Data
US 2009/0103500 A1 Apr. 23, 2009

Related U.S. Application Data

(60) Provisional application No. 61/000,261, filed on Oct. 23, 2007.

(51) Int. Cl.
*H04J 3/00* (2006.01)
(52) U.S. Cl. .......................................... 370/336
(58) Field of Classification Search .................. 370/336, 370/230, 437
See application file for complete search history.

(56) References Cited

U.S. PATENT DOCUMENTS

| | | | |
|---|---|---|---|
| 7,886,298 B2* | 2/2011 | Lubbers et al. ............... | 718/104 |
| 7,957,282 B2* | 6/2011 | Tseng et al. .................. | 370/230 |
| 2006/0203821 A1* | 9/2006 | Mizusawa et al. ............ | 370/392 |
| 2006/0227789 A1* | 10/2006 | Dottling et al. .......... | 370/395.21 |
| 2007/0133479 A1* | 6/2007 | Montojo et al. .............. | 370/335 |
| 2007/0223404 A1* | 9/2007 | Khan et al. ..................... | 370/278 |
| 2008/0117891 A1* | 5/2008 | Damnjanovic et al. ....... | 370/345 |
| 2008/0130492 A1* | 6/2008 | Kuo .............................. | 370/226 |

FOREIGN PATENT DOCUMENTS
WO WO 2007/105915 A1 9/2007

OTHER PUBLICATIONS

"HARQ Retransmissions for the DL Persistent Scheduling", 3GPP Draft; R2-073386 HARQ for DL Persistent Resource, 3rd Generation Partnership Project, Mobile Competence Centre; 650, Route Des Lucioles; F-06921 Sophia-Antipolis CEDEX; France.
"R2-062859: Semi Persistent Scheduling", 3GPP TSG-RAN WG2 Meeting #55, Seoul, Koreal [Online] vol. R2-062859, No. 55, Oct. 9, 2006, pp. 105.

(Continued)

*Primary Examiner* — Mark Rinehart
*Assistant Examiner* — Mohammad Anwar
(74) *Attorney, Agent, or Firm* — Harrton & Smith

(57) ABSTRACT

One or more hybrid automatic repeat request process identifications are configured for scheduling without associated control signaling. A particular HARQ process ID to be assumed for a given subframe is determined based on at least one of: a) system frame number; b) number of hybrid automatic repeat request processes that are allocated for semi-persistent scheduling; and c) periodicity for semi-persistent scheduling. In various embodiments: a) is broadcast and b) and c) are sent via RRC signaling; and the assumed particular HARQ process ID is determined as a function of [Current TTI/SP_Period] mod Num_SP_HARQ:wherein Current TTI is a number for the given subframe derived from the system frame number and the term [Current TTI/SP_Period] is rounded to an integer prior to the modulo operation; SP_Period is the periodicity of the semi-persistent scheduling; and Num_SP_HARQ is the number of hybrid automatic repeat request processes that are allocated for semi-persistent scheduling.

36 Claims, 4 Drawing Sheets

OTHER PUBLICATIONS

"3$^{rd}$ Generation Partnership Project; Technical Specification Group Radio Access Network; Evolved Universal terrestrial Radio Access Network (E-UTRAN); Overall description; Stage 2 (Release 8)", 3GPP TS 36.300 V8.2.0 (Sep. 2007), 109 pgs.

"Scheduling for VoIP", 3GPP TSG RAN WG2#56bis, R2-070188, Jan. 2007, 7 pgs.

"Problems of Persistent Scheduling", 3GPP TSG-RAN WG2#56bis, R2-070041, Jan. 2007, 7 pgs.

"3$^{rd}$ Generation Partnership Project; Technical Specification Group Radio Access Network; Evolved Universal Terrestrial Radio Access (E-UTRA) Medium Access Control (MAC) protocol specification (Release 8)", 3GPP TS 36.321 V1.0.0 (Sep. 2007), 18 pgs.

"Persistent scheduling and dynamic allocation", 3GPP TSG-RAN WG2#55, R2-062788, Oct. 2006, 6 pgs.

"Persistent Scheduling", 3 GPP TSG RAN WG2 Ad Hock on LTE, R2-061920, Jun. 2006, 5 pgs.

"R1-061734 Scheduling for Voice", 3GPP TSG RAN WG2 LTE AdHoc, R2-061994, Jun. 2006, 11 pgs.

"Downlink Scheduling for VoIP", 3GPP TSG RAN WG2 Meeting#57, R2-070475, 5 pgs.

"Uplink Scheduling for VoIP", 3GPP TSG RAN WG2 Meeting #57, R2-070476, 15 pgs.

"3$^{rd}$ Generation Partnership Project; Technical Specification Group Radio Access Network; Evolved Universal Terrestrial Radio Access (E-UTRA); Physical cannels and modulation (Release 8)", 3GPP TS 36.211 V.8.0.0, Sep. 2007, 50 pgs.

"3$^{rd}$ Generation Partnership Project; Technical Specification Group Radio Access Network; Evolved Universal Terrestrial Radio Access (E-UTRA); Multiplexing and channel coding (Release 8)", 3GPP TS 36.212 V8.0.0, Sep. 2007, 30 pgs.

"E-UTRA RRC-Report of discussion on measurements", 3GPP TSG RAN WG2 Meeting#59bis, R2-074322, Oct. 2007, 4 pgs.

"Apparatus, Method and Computer Program Product Providing Indication of Persistent Allocation on L1/L2 Control Channel", Esa Malkamaki, U.S. Appl. No. 60/919,110, filed Mar. 19, 2007, 21 pgs.

* cited by examiner

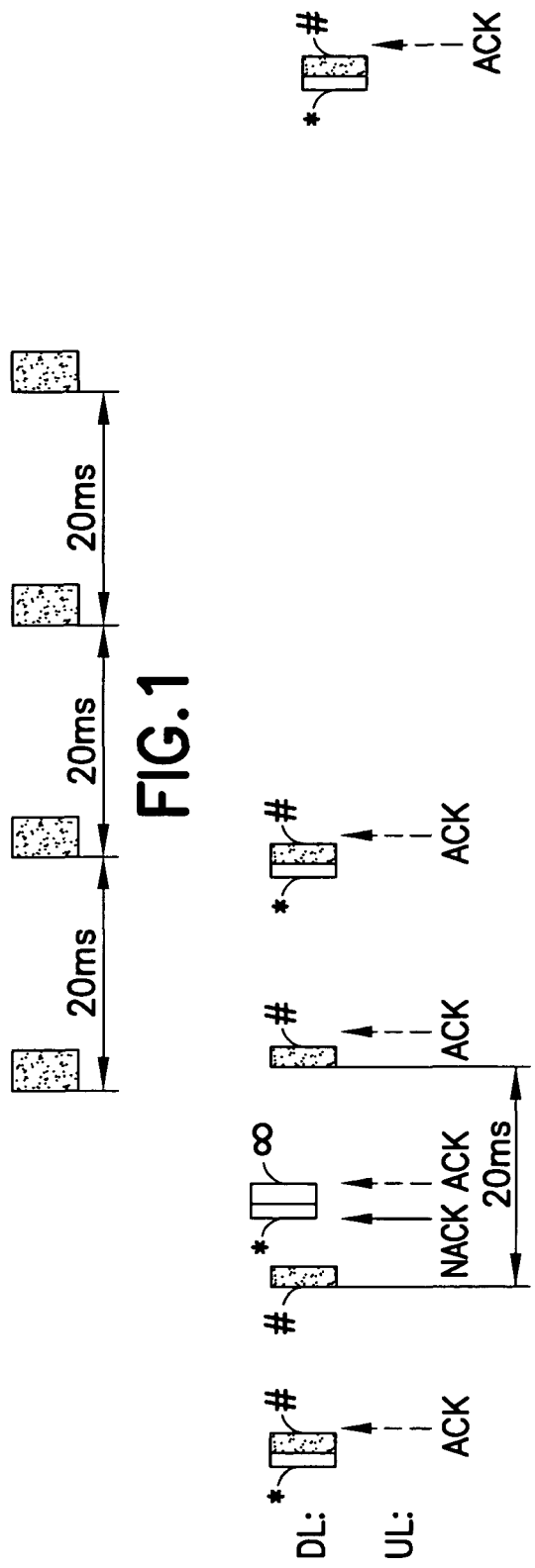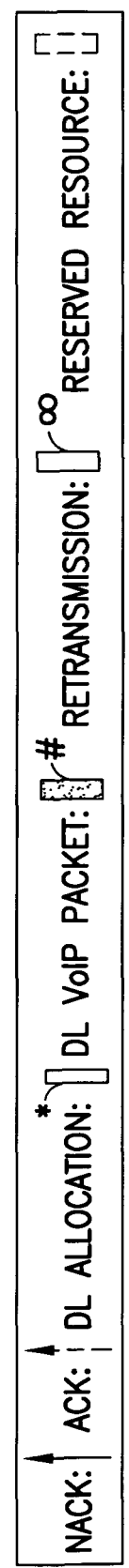

RE-TRANSMISSION CAPABILITY IN SEMI-PERSISTENT TRANSMISSION

CROSS-REFERENCE TO RELATED APPLICATIONS

This patent application claims priority under 35 U.S.C. §119(e) from U.S. Provisional Patent Application No. 61/000,261, filed Oct. 23, 2007, the disclosure of which is incorporated by reference herein in its entirety.

TECHNICAL FIELD

The exemplary and non-limiting embodiments of this invention relate generally to wireless communication systems, methods, devices and computer program products and, more specifically, relate to techniques used with semi-persistent resource allocation and hybrid automatic repeat request techniques.

BACKGROUND

Various abbreviations that appear in the specification and/or in the drawing figures are defined as follows:
ACK acknowledgement
aGW access gateway
BCH broadcast channel
CCH control channel
CDM code division multiplexing
DL downlink
DTX discontinuous transmission
eNB EUTRAN Node B (evolved Node B)
EUTRAN evolved UTRAN
FDD frequency division duplex
FDMA frequency division multiple access
3GPP third generation partnership project
HARQ hybrid automatic repeat request
LTE long term evolution
NACK negative acknowledgement
Node B base station
OFDM orthogonal frequency domain multiplex
PDCCH physical downlink control channel
PHY physical (layer 1 or L1)
PS packet scheduler
RRC radio resource control (layer 2 or L2)
RV redundancy version
SCCH shared control channel
SC-FDMA single carrier, frequency division multiple access
SFN system frame number
TBS transport block set
TFI transport format indicator
TTI transmission time interval
UE user equipment
UL uplink
UTRAN universal terrestrial radio access network
VoIP voice over internet protocol A proposed communication system known as evolved UTRAN (E-UTRAN, also referred to as UTRAN-LTE or as E-UTRA) is currently under development within the 3GPP. The current working assumption is that the DL access technique will be OFDMA, and the UL access technique will be SC-FDMA.

One specification of interest to these and other issues related to the invention is 3GPP TS 36.300, V8.2.0 (2007-09), 3rd Generation Partnership Project; Technical Specification Group Radio Access Network; Evolved Universal Terrestrial Radio Access (E-UTRA) and Evolved Universal Terrestrial Access Network (E-UTRAN); Overall description; Stage 2 (Release 8), which is attached to the priority document as Exhibit A.

In wireless communication systems where control channel resources are limited, such as in LTE, it is desirable to provide optimizations to improve the utilization of the control channel resources. One optimization technique involves some type of persistent or semi-persistent allocation of transmission resources. This technique assigns the resources for transmission in the DL or UL for a longer period than one transmission (e.g., the resource(s) may be assigned for use by a UE for a number of time (transmission) periods. In the LTE system it has been agreed that semi-persistent scheduling will be used.

VoIP traffic is one type of traffic for which persistent or semi-persistent scheduling is desirable. Reference in this regard may be made to R2-070188, "Scheduling for VoIP", Siemens Networks, 3GPP TSG RAN WG2#56bis, Sorrento, Italy, 15-19 Jan. 2007, which is attached to the priority document as Exhibit B. In general, persistent scheduling implies that a resource pattern is assigned to a UE for a relatively long period of time, without the need for continual scheduling grants over the L1/L2 control channel. With persistent scheduling, a VoIP UE is allowed to use the allocated physical resource blocks once every 20 ms, as depicted in FIG. 1.

Reduced signaling overhead and simplicity are the two main advantages for supporting persistent scheduling in LTE. Reference in this regard may be had to R2-070041, "Problems of Persistent Scheduling", Ericsson, 3GPP TSG RAN WG2#56bis, Sorrento, Italy, 15-19 Jan. 2007, which is attached to the priority document as Exhibit C.

The main advantage of persistent scheduling is that DL or UL scheduling grants do not need to be transmitted for each VoIP frame, which reduces the control signaling overhead and thereby increases the system capacity. This is particularly beneficial as the L1/L2 control signaling resources are limited by the specification and in the case of VoIP (or other traffic characterized by periodically coming small packets with delay constraint) there is a need to schedule several user to the same TTI.

To reiterate, in that the periodicity pattern of transmission/reception resources are assigned to the UE with higher layer signaling (e.g., RRC signaling), then the UE can transmit or receive in those assigned resources without explicit L1/L2 control signaling (i.e., without the use of the PDCCH). One example is shown in FIG. 2, where a 'talk spurt-based' semi-persistent allocation is shown for a VoIP application. The RRC signaling is used to assign a 20 ms periodicity pattern to the UE. When traffic is identified in the beginning of the talk-spurt, the time and frequency resources and transport format are assigned to the UE with L1/L2 control signaling (i.e., with the PDCCH). The UE then stores an indication of these assigned time and frequency resources, and transport format information. This stored information informs the UE that it can either transmit (UL) or receive (DL) the assigned format of packets with these resources with the known periodicity pattern (signaled via RRC).

As shown in FIG. 2, re-transmissions in the DL are sent with L1/L2 control signaling, as the semi-persistent scheduling is typically applied for an initial (VoIP) packet transmission, even if it could be applied also for a first re-transmission of the packet.

DL asynchronous HARQ is specified in 3GPP for the LTE system, which means that for each TTI, in principle, a HARQ process can be assigned. The HARQ process number is informed to the UE via a DL allocation in the PDCCH. However, in semi-persistent scheduling the PDCCH is not used, and thus another problem that arises is how to inform the UE of which HARQ process is used for some certain semi-persistent allocation.

If only one HARQ process identification (ID) is used for the semi-persistent case then the problem would be more readily solved. However as can be seen from FIG. 2 that in this exemplary VoIP example only two re-transmissions would be possible until the same HARQ process is needed again for the semi-persistent transmission. This limitation has the potential to detrimentally affect the performance of the UE.

One possible solution would be to reserve more processes for semi-persistent use and/or to increase the number of HARQ processes. In both cases, however, there needs to be a mechanism in place to indicate which of the reserved HARQ processes are used in which semi-persistent transmission (without using PDCCH signaling). In one exemplary scenario the use of more HARQ processes can imply more signaling being required in the PDCCH, which in turn increases UE complexity and memory requirements. Alternatively, reserving more HARQ processes for semi-persistent scheduling, without increasing the total number of processes, would imply that the semi-persistently configured UE's other traffic throughput would suffer, as there would be fewer HARQ buffers available for the other traffic.

In co pending and commonly owned U.S. Provisional Patent Application No. 60/919,110, filed Mar. 19, 2007, "Apparatus, Method and Computer Program Product Providing Indication of Persistent Allocation on L1/L2 Control Channel" by Esa Malkamäki (which is attached to the priority document as Exhibit D), the following is described. For asynchronous HARQ it is possible to reserve one (or several) HARQ process(es) for persistent allocation. The reservation can be performed, e.g., via RRC signaling. Thus, the HARQ process identification (ID) is descriptive of whether the allocation is a normal dynamic (one-time) allocation or is a persistent allocation to be stored and used for subsequent transmissions. The redundancy version (RV) or re-transmission sequence number (RSN) can be used to distinguish between an initial transmission (which is sent with L1 control only if the persistent allocation is changed) and re-transmission (e.g., RV=0/RSN=0 is reserved only for initial transmission). This shows one example how dynamic and semi-persistent allocations for initial or retransmissions can be distinguished from each other.

Other publications of interest to this invention include:

3GPP TS 36.321 V1.0.0 (2007-09) Technical Specification; 3rd Generation Partnership Project; Technical Specification Group Radio Access Network; Evolved Universal Terrestrial Radio Access (E-UTRA) Medium Access Control (MAC) protocol specification (Release 8), attached to the priority document as Exhibit E;

3GPP TSG-RAN WG2 #55, R2-062788, Seoul (Korea), 9-13 Oct. 2006, NEC, "Persistent scheduling and dynamic allocation", attached to the priority document as Exhibit F;

3GPP TSG-RAN WG2 Ad Hoc on LTE, R2-061920, Cannes, France, 27-30 Jun. 2006, NTT DoCoMo, Inc. "Persistent Scheduling", attached to the priority document as Exhibit G;

3GPP TSG-RAN WG2 Ad Hoc on LTE, R2-061994, Cannes, France, 27-30 Jun. 2006, Motorola,. "R1-061734 Scheduling for Voice", attached to the priority document as Exhibit H and;

3GPP TSG-RAN WG2 Meeting #57, R2-070475, St. Louis, USA, 12-16 Feb. 2007, Nokia, "Downlink Scheduling for VoIP", attached to the priority document as Exhibit I;

3GPP TSG-RAN WG2 Meeting #57, R2-070476, St. Louis, USA, 12-16 Feb. 2007, Nokia, "Uplink Scheduling for VoIP", attached to the priority document as Exhibit J;

3GPP TS 36.211 V8.0.0 (2007-09) Technical Specification; 3rd Generation Partnership Project; Technical Specification Group Radio Access Network; Evolved Universal Terrestrial Radio Access (E-UTRA); Physical channels and modulation (Release 8), attached to the priority document as Exhibit K; and 3GPP TS 36.212 V8.0.0 (2007-09) Technical Specification; 3rd Generation Partnership Project; Technical Specification Group Radio Access Network; Evolved Universal Terrestrial Radio Access (E-UTRA); Multiplexing and channel coding (Release 8), attached to the priority document as Exhibit L.

SUMMARY

In accordance with one exemplary embodiment of the invention is a method that includes configuring one or more hybrid automatic repeat request process identifications that are to be used for scheduling without associated control signaling; and determining a particular hybrid automatic repeat request process identification to be assumed for a given subframe. The determining is based on at least one of: a system frame number; a number of hybrid automatic repeat request processes that are allocated for semi-persistent scheduling; and a periodicity for semi-persistent scheduling.

In accordance with another exemplary embodiment of the invention is an apparatus that includes a processor. The processor is configured to set one or more hybrid automatic repeat request process identifications for scheduling without associated control signaling. The processor is configured to determine a particular hybrid automatic repeat request process identification to be assumed for a given subframe, based on at least one of: a system frame number; a number of hybrid automatic repeat request processes that are allocated for semi-persistent scheduling; and a periodicity for semi-persistent scheduling.

In accordance with still another exemplary embodiment of the invention is a memory storing a program of computer readable instructions that when executed by a processor result in actions that include configuring one or more hybrid automatic repeat request process identifications that are to be used for scheduling without associated control signaling; and determining a particular hybrid automatic repeat request process identification to be assumed for a given subframe. The determining is based on at least one of: a system frame number; a number of hybrid automatic repeat request processes that are allocated for semi-persistent scheduling; and a periodicity for semi-persistent scheduling.

In accordance with another exemplary embodiment of the invention is an apparatus that includes processing means (such as for example the DP 12A or HARQ module 10F of FIG. 3) and also determining means (such as for example the DP 12A or HARQ module 10F of FIG. 3). The processing means is for configuring one or more hybrid automatic repeat request process identifications for scheduling without associated control signaling. The determining means is for determining a particular hybrid automatic repeat request process identification to be assumed for a given subframe, based on at least one of: a system frame number; a number of hybrid automatic repeat request processes that are allocated for semi-persistent scheduling; and a periodicity for semi-persistent scheduling.

In accordance with yet another exemplary embodiment of the invention is a method that includes receiving data without associated control signaling; and determining a particular hybrid automatic repeat request process identification for the received data, wherein the determining is based on at least one of: a system frame number; a number of hybrid automatic repeat request processes that are allocated for semi-persistent scheduling; and a periodicity for semi-persistent scheduling.

In accordance with a further exemplary embodiment of the invention is an apparatus that includes a buffer and a processor. The buffer is configured to store data that is received without associated control signaling. The processor is configured to determine a particular hybrid automatic repeat request process identification for the received data based on at least one of: a system frame number; a number of hybrid automatic repeat request processes that are allocated for semi-persistent scheduling; and a periodicity for semi-persistent scheduling.

In accordance with yet a further exemplary embodiment of the invention is a memory storing a program of computer readable instructions that when executed by a processor result in actions that include receiving data without associated control signaling; and determining a particular hybrid automatic repeat request process identification for the received data. The determining is based on at least one of: a system frame number; a number of hybrid automatic repeat request processes that are allocated for semi-persistent scheduling; and a periodicity for semi-persistent scheduling.

In accordance with still another exemplary embodiment of the invention is an apparatus that includes receiving means (such as for example the receiver portion of the transceiver 10D, the HARQ module 10F, or the HARQ buffer of FIG. 3) and processing means (e.g., the DP 10A, the VC 10E, or the HARQ module 10F of FIG. 3). The receiving means is for storing data that is received without associated control signaling. The processing means is for determining a particular hybrid automatic repeat request process identification for the received data based on at least one of: a system frame number; a number of hybrid automatic repeat request processes that are allocated for semi-persistent scheduling; and a periodicity for semi-persistent scheduling.

BRIEF DESCRIPTION OF THE DRAWINGS

In the attached Drawing Figures:

FIG. 1 shows an example of persistent allocation for a VoIP UE.

FIG. 2 depicts an example of talk spurt-based semi-persistent scheduling in the DL.

DETAILED DESCRIPTION

Figure 3:
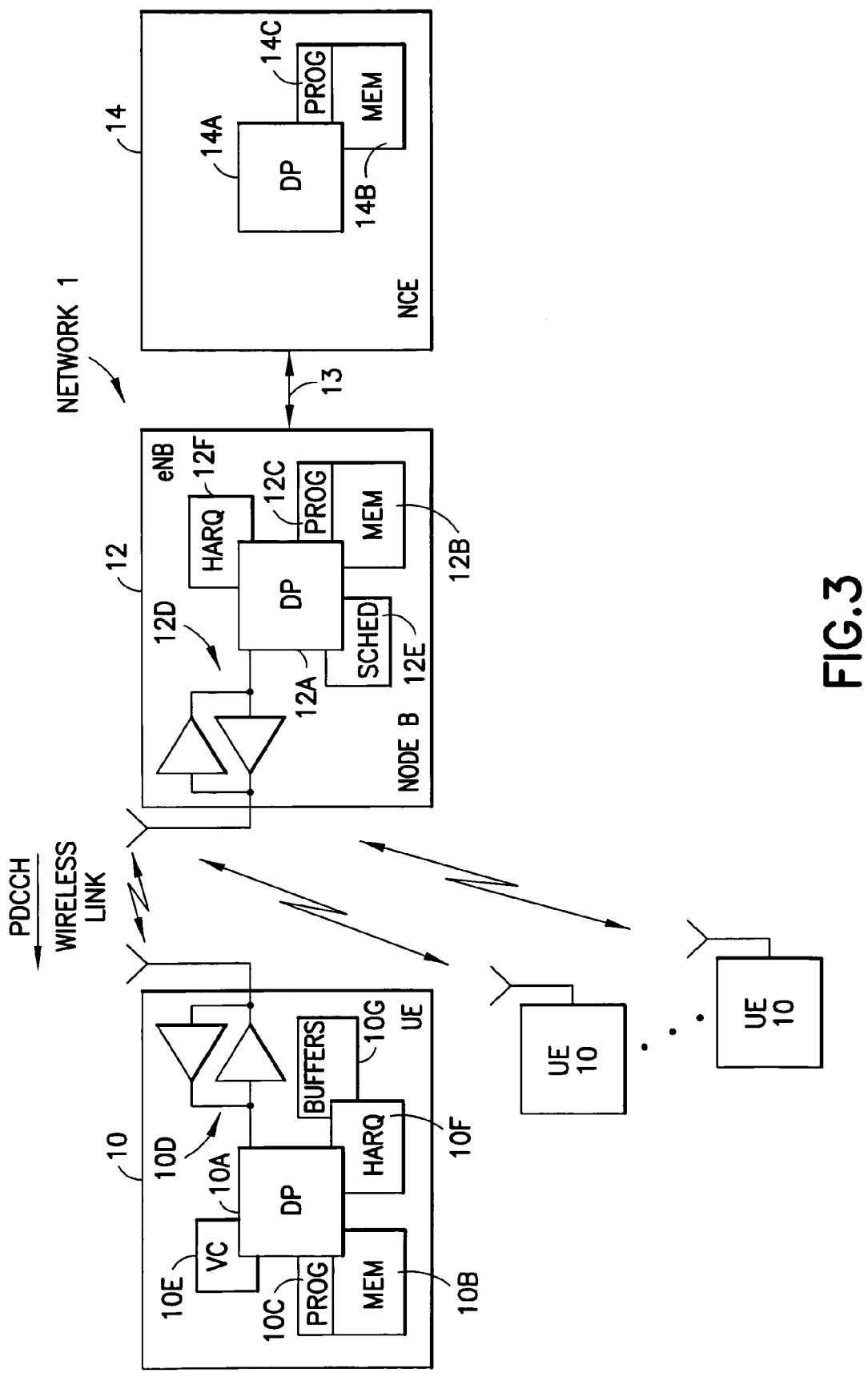
FIG. 3 shows a simplified block diagram of various electronic devices that are suitable for use in practicing the exemplary embodiments of this invention.

Reference is made to FIG. 3 for illustrating a simplified block diagram of various electronic devices that are suitable for use in practicing the exemplary embodiments of this invention. In FIG. 3 a wireless network 1 is adapted for communication with a plurality of UEs 10 via an eNodeB (base station) 12, also referred to herein as eNB 12. The network 1 may include a network control element (NCE) 14.

The UE 10 includes a data processor (DP) 10A, a memory (MEM) 10B that stores a program (PROG) 10C, and a suitable radio frequency (RF) transceiver 10D for bidirectional wireless communications with the eNB 12, which also includes a DP 12A, a MEM 12B that stores a PROG 12C, and a suitable RF transceiver 12D. The eNB 12 is coupled via a data path 13 to the NCE 14, such as an aGW, that also includes a DP 14A and a MEM 14B storing an associated PROG 14C.

It may be assumed that the UE 10 will include a suitable voice coder (VC)10E, such as an AMR voice coder, that is used at least when functioning in a VoIP mode of operation. The UE 10 will also include a HARQ functional block or module 10F, that can be assumed to include and manage HARQ buffers 10G. The HARQ buffers 10G will typically reside in the memory 10B.

The eNB 12 is shown to include a resource scheduler module or function (SCHED) 12E, and will also include a HARQ functional block or module 12F and associated HARQ buffers (not shown). The various modules and functions 10F, 12E and 12F, as well as the voice coder module 10E, may be implemented using hardware, software (including firmware), or with a combination of hardware and software.

The PROGs 10C and 12C may thus be assumed to include program instructions that, when executed by the associated DP, enable the electronic device to operate in accordance with the exemplary embodiments of this invention, as will be discussed below in greater detail. That is, the exemplary embodiments of this invention may be implemented at least in part by computer software executable by the DP 10A of the UE 10 and by the DP 12A of the eNB 12, or by hardware, or by a combination of software and hardware.

In general, the various embodiments of the UEs 10 can include, but are not limited to, cellular telephones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

The MEMs 10B, 12B and 14B may be of any type suitable to the local technical environment and may be implemented using any suitable data storage technology, such as semiconductor-based memory devices, flash memory, magnetic memory devices and systems, optical memory devices and systems, fixed memory and removable memory. The DPs 10A, 12A and 14A may be of any type suitable to the local technical environment, and may include one or more of general purpose computers, special purpose computers, microprocessors, digital signal processors (DSPs) and processors based on a multi-core processor architecture, as non-limiting examples.

Figure 5:
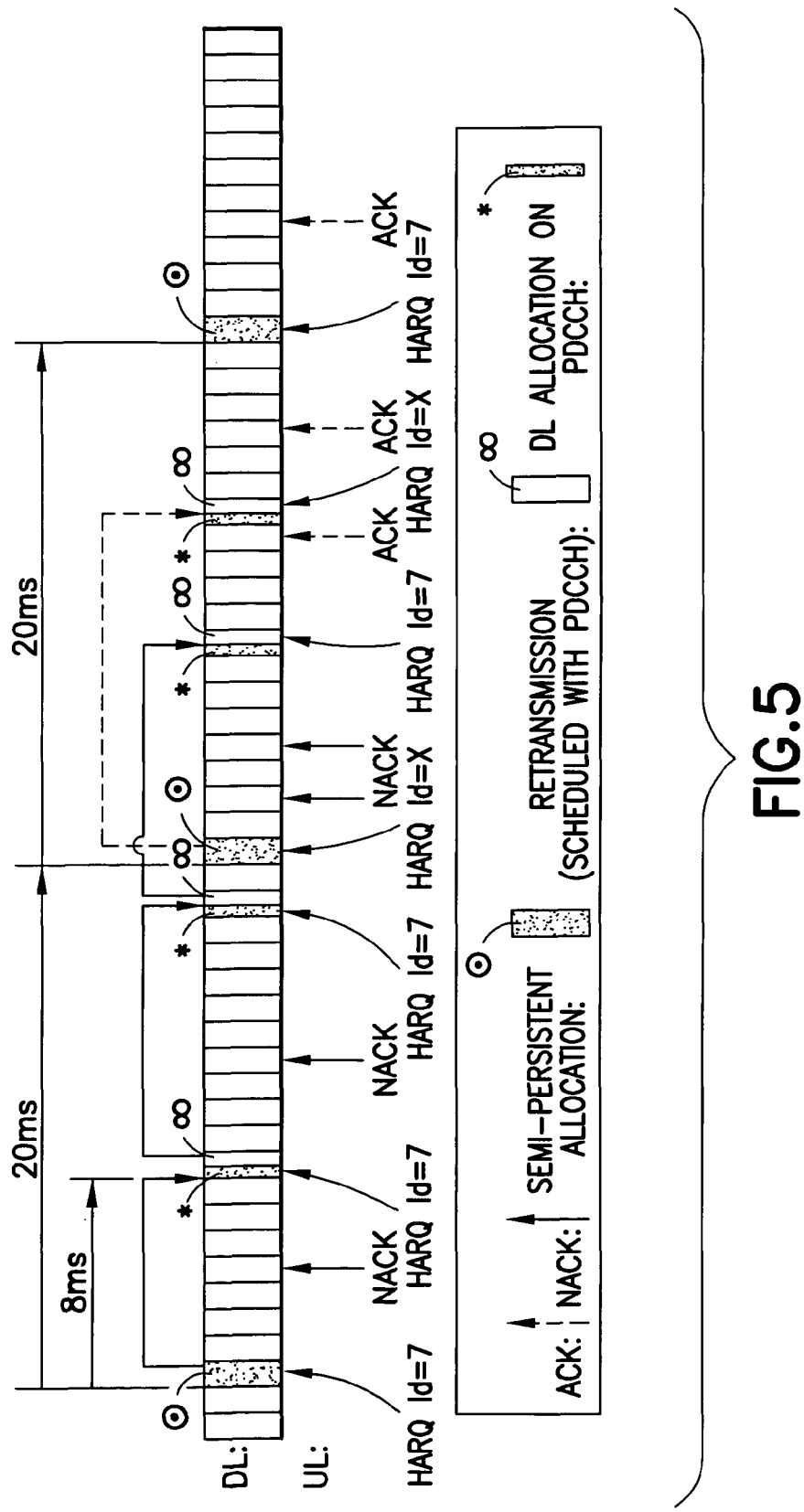
FIG. 5 depicts DL and UL signaling for a case of a UE having a semi-persistent allocation, and is useful in explaining the benefits made possible by the use of the exemplary embodiments of this invention.

FIG. 5 depicts DL and UL signaling for a case of the UE 10 having a semi-persistent allocation, and is useful in explaining the benefits made possible by the use of the exemplary embodiments of this invention. In FIG. 5 the UE 10 has a semi-persistent allocation in the DL with periodicity of 20 ms, which is typical for VoIP traffic. When the ULE 10 is scheduled semi-persistently it cannot obtain the HARQ process ID via the DL allocation in the PDCCH (as the PDCCH is not used in semi-persistent scheduling). This problem can be overcome by using only one HARQ process ID for indicating semi-persistent scheduling (e.g., HARQ ID=7 in the Figure). However, if the re-transmissions extend over the next semi-persistent transmission (of a new packet) 20 ms later, the same HARQ ID would be needed again (in the figure HARQ ID=X, where X would be 7). This would limit the maximum number of re-transmissions to two and thus detrimentally affect the performance. On the other hand, if more than one HARQ ID is used for the semi-persistent allocation (in the Figure, X may be, e.g., 1 in HARQ ID=X, so that HARQ IDs 7 and 1 would be alternating), then there needs to be some way to in which to know which HARQ ID is used for which semi-persistent transmission. The exemplary embodiments of this invention address this need, and solve this and other problems.

Turning now to a description of the exemplary embodiments of this invention it can be noted that, in general, the RRC configuration of semi-persistent scheduling should include a periodicity pattern and possibly other parameters such as, for example, a reduced set of TBS and ACK/NACK resources. In accordance with an exemplary embodiment of this invention, also included in the RRC configuration is the following:

a HARQ process number that indicates semi-persistent; and/or the number of HARQ processes for semi-persistent scheduling and/or HARQ identifications used for semi-persistent scheduling; or alternatively the periodicity pattern per HARQ process.

The semi-persistent allocation may be identified with, for example, an additional bit in the PDCCH, or by the HARQ process number that is configured for semi-persistent use with RRC signaling. The HARQ process number can be used to separate the semi-persistent allocation from the dynamic allocation (as described in the above-referenced U.S. Provisional Patent Application No. 60/919,110). The UE 10 is configured as semi-persistent by RRC signaling. Then, for example, if a total of 8 HARQ processes can be identified in the PDCCH, the HARQ IDs 0-6 may be used for dynamic scheduling purposes. However, if the HARQ ID is made equal to 7 in the PDCCH this indicates to the UE 10 to store from this PDCCH those parameters needed for semi-persistent use.

It can be noted that the use of this technique it particularly advantageous if only one HARQ process is needed. When more than one HARQ process is needed for semi-persistent transmission then this information is included in the RRC signaling. Similar to the case of one HARQ process, one HARQ ID is used to indicate semi-persistent scheduling (or alternatively, for example, a separate bit can be used in the PDCCH). The identification of the actual HARQ buffer is then derived either implicitly or partly implicitly and partly explicitly. For this purpose several different implementation embodiments are possible, as described below.

An aspect of the these exemplary embodiments is the definition of a set of rules for the UE 10 and the eNB 12 to determine which HARQ process ID is being used for a specific transmission, in the case where more than one HARQ process is reserved for semi-persistent allocation.

In another exemplary embodiment the problem is solved for the case of HARQ re-transmissions overlapping with the next semi-persistent allocation (using the same HARQ process ID). This embodiment permits several different semi-persistent allocations to be configured (each with their own parameters, such as periodicity). Individual HARQ processes can then be reserved for these allocations so that each HARQ process corresponds to one semi-persistent allocation. In this approach the above-mentioned problem is avoided by configuring the periodicity of each semi-persistent allocation to be sufficiently long to handle (with high probability) all possible re-transmissions that may be needed before the next cycle of the same semi-persistent allocation. If shorter periodicity is required by the traffic, several semi-persistent allocations are assigned to the traffic.

For example, in the VoIP case where the packet inter-arrival rate is typically 20 ms, it can easily happen that before the re-transmissions of one semi-persistent transmission have been handled, the next initial packet transmission will already be scheduled. This can be made significantly less likely to occur if the VoIP traffic is handled with two semi-persistent allocations, each with 40 ms periodicity. Each one of these semi-persistent allocations uses its own HARQ process. Moreover the same rule can be applied further to have for VoIP, and for example, a 60 ms periodicity and to allocate three HARQ processes.

Another benefit that is realized by the use of this approach is that the UE 10 can have several semi-persistent allocations with different characteristics. Furthermore, this approach works well with half-duplex terminals (as in this case one cannot have a 20 ms periodicity for the semi-persistent allocation). For example, a pattern of 24, 16, 24, 16, etc., ms can be implemented with two semi-persistent allocations each having a periodicity of 40 ms, but scheduled 24 ms apart.

Describing these exemplary embodiments of the invention in further detail, if the semi-persistent scheduling is signaled via a dedicated HARQ process, but several HARQ processes are needed for the semi-persistent scheduling, the eNB 12 may include 1 bit to indicate the semi-persistent allocation in the PDCCH, and the semi-persistent allocation changes the meaning of HARQ process indication bits at the UE 10. This approach solves the problem for the initial semi-persistent transmission (but not for a following semi-persistent transmission), as well as for re-transmissions of the semi-persistent allocation.

It is also within the scope of these exemplary embodiments that the signaling is not increased (e.g., by one bit), and in this case there exist several possibilities of how to arrange the needed HARQ buffers. The following alternative embodiments relate to the arrangement of the DL signaling.

Embodiment 1A: The PDCCH signaling is able to signal X HARQ processes (e.g., with 3 bits X=8). One of the values of X indicates semi-persistent HARQ scheduling. The number of HARQ processes for the semi-persistent case is given by N and is signaled via RRC signaling, where one HARQ process ID indicates semi-persistent. The HARQ buffer that indicates semi-persistent (e.g., buffer 7, when X=8) is divided into N sub-buffers (e.g., 7, 8, . . . ,7+N−1). Since the semi-persistent allocation is more suitable for traffic with small packets, such as VoIP, it is assumed that the size of these sub-buffers is adequate for the semi-persistent traffic. Then for each semi-persistent allocation (for new packets) the sub-buffer identification may be derived implicitly from the periodicity pattern, the TTI number and the number of HARQ buffers reserved for semi-persistent usage One such formula is:

$$\text{sub-buffer} = [\text{trunc}(\text{current\_TTI}/\text{SP\_period})] \bmod \text{Number\_of\_semi-persistent\_HARQ},$$

Where "current_TTI" is the number of the TTI under consideration, "SP_period" is the periodicity of the semi-persistent scheduling (in TTIs) and "Number_of_semi-persistent_HARQ" is the number of HARQ processes reserved for semi-persistent scheduling. Truncate (trunc) implies rounding to the nearest integer (note that a floor function is sometimes used for this purpose and 'trunc' may specifically mean rounding down). Current_TTI number is assumed to be known by both the eNB 12 and the UE 10. It may be derived from the radio frame number (or system frame number SFN) that is incremented every 10 ms. For example, the following formula could be used:

Current_TTI=10*SFN+sub_frame_number

Where sub_frame_number is the sub-frame numbering inside one radio frame (inside one SFN), i.e., sub_frame_number=0, 1, 2, . . . , 9. SFN can be broadcast in the cell, e.g., on the BCH.

Another issue is to provide an ability to identify the correct HARQ buffer when re-transmissions are scheduled. For this purpose the possible solution options are given below in embodiments 2B, 3B and 4B.

Embodiment 2A: In the PDCCH it is possible to signal one of X HARQ processes (e.g., with 3 bits X=8). One of these X values indicates that parameters in PDCCH are used for semi-persistent allocation. The number of HARQ processes for semi-persistent is N, and this value is signaled via RRC signaling, where one HARQ process ID indicates semi-persistent, e.g., the last HARQ buffer X−1. The HARQ buffer is divided to X+N−1 buffers, which do not need to be of equal size, e.g., for semi-persistent allocations smaller size buffers may be adequate. Then if the PDCCH indicates the semi-persistent via the HARQ process ID, or if semi-persistent allocation is in use, the correct HARQ buffer for the semi-persistent transmissions of new packets can be derived by the formula:

HARQ buffer=X−1+[trunc(current_TTI/SP_period)] mod Number_of_semi-persistent_HARQ.

For the re-transmissions of semi-persistent allocation several possible signaling solutions are given below in the embodiments 2B, 3B, and 4B.

Embodiment 3A: The PDCCH signaling is capable of signaling X HARQ processes. Several HARQ processes and HARQ IDs are reserved for semi-persistent. One of these indicates semi-persistent in the initial allocation to identify that semi-persistent is in use. All of these HARQ IDs form a vector Y of HARQ processes. The used HARQ process in the case of semi-persistent allocation may be derived from, for example, the following formula:

vector_index=[trunc(current_TTI/SP_period)]mod Number_of_semi-persistent_HARQ

HARQ buffer=Y(vector_index).

For the re-transmissions of semi-persistent allocation possible signaling solutions are described below with relation to embodiments 1B, 2B, 3B, and 4B.

Embodiment 4A: In all of these different embodiments described thus far instead of the expression: trunc(current_TTI/SP_period)] there could instead be an explicit counter that is increased according the periodicity pattern. For the re-transmissions of semi-persistent allocation possible signaling solutions are described below with relation to embodiments 1B, 2B, 3B, and 4B.

Embodiment 5A: This embodiment assumes the presence of a separate bit indicating semi-persistent transmission in the PDCCH. If several HARQ buffers (N) are needed for semi-persistent use, and originally X HARQ buffers exist, the X HARQ buffers may be divided into X+N buffers, which do not need to be equal size. Then N of these buffers are reserved for semi-persistent usage, and if the semi-persistent bit is on in the PDCCH signaling, the HARQ bits in the HARQ field of the DL-CCH indicate which of the N buffers this semi-persistent transmission is intended to be stored (see embodiment 4B). For the semi-persistent transmission of a new packet either a counter, as in embodiment 4A, or the expression as in embodiment 3A (where Y contains N possible HARQ buffers) can be used to derive the identification of the buffer to be used.

Further explanation of the foregoing can be had by referring again to FIG. 5. The current TTI is an "increasing number" which indicates the current TTI. The SP period is semi-persistent periodicity, e.g., 20 ms or 20 TTI. The number of semi-persistent HARQ equal N (e.g., 7 and X in FIG. 5) HARQ buffers used for semi-persistent that are signaled via RRC. In this case trunc(current_TTI/SP_period) mod N indicates which of the N (e.g., in FIG. 5 two) buffers to use. The trunc(current_TTI/SP_period) is thus the integer number of semi-persistent periods. As was noted above, this may be replaced by a counter which may start when the semi-persistent allocation is given, and would then be incremented in every semi-persistent allocation possibility (e.g., every 20 ms). Thus, the trunc(current_TTI/SP_period) may be interpreted as a semi-persistent serial number.

Embodiment 6A: This embodiment assumes that several HARQ processes (Num_SP_HARQ) are reserved for semi-persistent scheduling. For instance, two processes could be reserved (e.g., processes 5 and 6). In this example the lower value of these reserved processes (i.e., process id 5) is used when signaling on the PDCCH the parameters to be stored. That is, when HARQ_ID=5 is used on PDCCH, the UE 10 stores the parameters including the HARQ process id (Stored_HARQ_ID=5). After every 20 ms, the semi-persistent allocation is valid (SP_Period=20) and the HARQ process id for the initial transmission can be calculated from the formula shown below, i.e., the HARQ_ID for the semi-persistent allocation is swapped every 20 ms. Here one may assume that HARQ process id is signaled on the PDCCH using either 3 or 4 bits. In the following the SCCH (shared control channel) is used instead of the PDCCH. The re-transmission HARQ process is simply indicated by the HARQ_ID and RV>0, i.e., in this example HARQ_D=5 or 6 for the retransmissions.

The following is a non-limiting example of a modification that may be made to 3GPP TS 36.321 (MAC protocol specification) in particular in Section 5.3.1 :DL assignment reception:

Periodicity of semi-persistent allocation (SP_Period), the number of unused semi-persistent allocations before the release of the semi-persistent allocation (N_SP) and the number of HARQ processes (Num_SP_HARQ) as well as the HARQ_IDs reserved for semi-persistent allocation are signaled by RRC. Semi-persistent allocation is indicated with one of the reserved HARQ_IDs. The following describes the UE operation:

When not in DRX, the UE shall for each TTI:

If a downlink assignment for this TTI has been received on the [SCCH]:

Indicate a downlink assignment and the associated HARQ information to the HARQ entity for this TTI;

if the downlink assignment is a new persistent assignment (indicated on the [SCCH]):

store the downlink assignment and the associated HARQ information (Stored_HARQ_ID=HARQ_ID) as well as the TTI number (Stored_DL_TTI=Current_TTI);

else if there exists a stored downlink assignment for a new transmission for this TTI (i.e., (Current_TTI—Stored_DL_TTI) mod SP_Period=0) but the stored assignment has not been used during the N_SP previous instances:
  release the stored downlink assignment;
else if there exists a stored downlink assignment for a new transmission for this TTI (i.e., (Current_TTI—Stored_DL_TTI) mod SP_Period=0):
  Indicate the stored downlink assignment for a new transmission and the stored HARQ information to the HARQ entity for this TTI (e.g., Current_HARQ_ID=Stored_HARQ_ID+[trunc (Current_TTI/SP_Period)] mod Num_SP_HARQ);

The stored assignment is considered unused if the UE cannot decode correctly the corresponding new transmission and does not receive correctly [SCCH] (within a retransmission window) allocating a retransmission for the corresponding semi-persistent allocation.

Described now are several embodiments for identifying the HARQ process in the case a re-transmission is needed.

Embodiment 1B: If four bits are used in the PDCCH for indicating the HARQ buffer, then the Number_of semi-persistent_HARQ processes of all HARQ process IDs can be reserved for semi-persistent usage. In the re-transmission the correct HARQ buffer can be identified, the RV number indicates that this is a re-transmission, and thus parameters need not be stored for semi-persistent usage. Thus the HARQ process id for the retransmissions is signaled explicitly on PDCCH (it is assumed that PDCCH is always sent for DL HARQ retransmissions).

The foregoing may be considered as a simplest approach, where four bits in the HARQ process ID are used, and is included for completeness. This approach does not require that the HARQ process id for the re-transmission is known implicitly, as it is known precisely by the signaling. However, it may be the case that 4 bits are used for HARQ process id anyway due to the MIMO signaling needs.

Embodiment 2B: There is a separate format for semi-persistent re-transmission (e.g., a more compact format, as already proposed in 3GPP). In this case log 2(Number_of semi-persistent_HARQ processes) bits are used to indicate the HARQ buffer. This is a direct (explicit) indication to the HARQ processes and the buffers or sub-buffers reserved for semi-persistent use.

Embodiment 3B: During a re-transmission of a semi-persistent allocation the HARQ ID indicates the semi-persistent HARQ buffer, and RV indicates that this is a re-transmission. In this case, and for example, TFI or TBS can be interpreted differently. Only a limited set of possible TFI/TBS values are needed for semi-persistent use. Note that for re-transmission it may even be assumed that the TFI/TBS information is the same as for the initial transmission). Remaining (unused) bits of the TFI/TBS indication can be used to indicate the correct HARQ buffer/process. In this case the same DL-CCH 'format' can be used for re-transmission.

General reference with regard to normal RV, TFI and TBS usage may be made, for example, to Exhibit L, 3GPP TS 36.212, such as section 5.3.3 "Downlink Control Channel", and to Exhibit J, 3GPP 36.211, such as section 6.8 "Physical downlink control channel". Reference can also be made to 3GPP TSG-RAN WG2 Meeting #59bis, Shanghai, China, 8-12 Oct. 2007. "E-UTRA RRC—Report of discussion on measurements", Tdoc R2-074322 (Motorola), attached hereto as Exhibit M and incorporated by reference in its entirety.

Embodiment 4B: In this embodiment a separate bit is included in the PDCCH to indicate whether a transmission is semi-persistent. This bit permits different interpretations of the HARQ identification bits, depending on whether there is a semi-persistent transmission or a dynamic (non-semi-persistent) transmission. The RV information then determines whether to store the semi-persistent information, or whether the allocation is for re-transmission. In the semi-persistent transmission case the HARQ bits refer to the HARQ buffers reserved for semi-persistent use.

There are also several alternative embodiments that can be considered.

Embodiment 1C: Each semi-persistent allocation is assigned its own HARQ process ID (and each semi-persistent allocation may also have its own periodicity). To avoid re-transmissions overlapping with a semi-persistent transmission of a new packet, more than one semi-persistent allocation can be configured. As one non-limiting example, two allocations with 40 ms periodicity may be used to effectively create a 20 ms periodicity pattern.

Embodiment 2C: In addition to the embodiment 1C above, if the PDCCH contains 1 bit to indicate semi-persistent, and originally there are X HARQ processes and N semi-persistent configurations, the UE 10 memory can be divided into X+N buffers. In this case the HARQ buffers for different semi-persistent configurations can be derived as in the embodiment 5A, with the exception that N semi-persistent parameters need to be stored in the memory.

Embodiment 3C: If only one HARQ process ID can be assigned to the semi-persistent allocation, and originally there exist X HARQ processes and N semi-persistent configurations, the UE 10 memory can be divided to X+N buffers. In this case the HARQ buffers for different semi-persistent configurations are derived as in the embodiments 1A or 2A, with the exception that in the case of an initial transmission the PDCCH also defines which parameters need to be stored for each separate HARQ process semi-persistent configuration. The re-transmissions can be handled as described in any of the embodiments 1B, 2B, or 3B.

Figure 4:
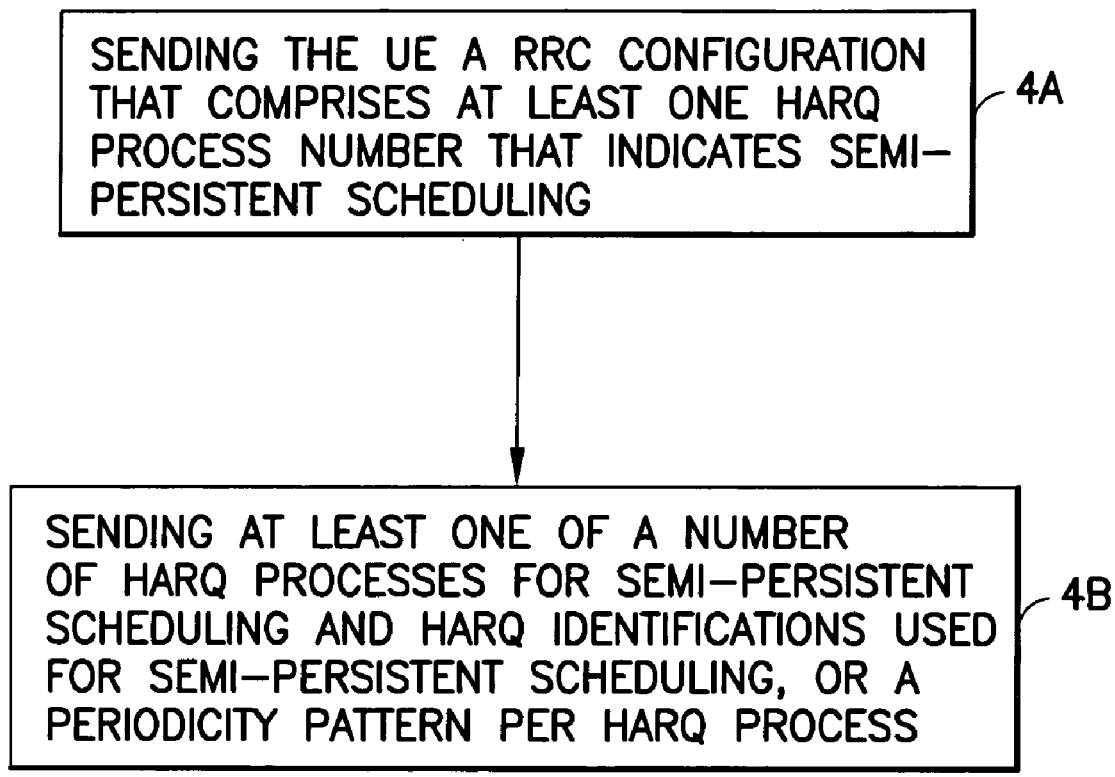
FIG. 4 shows a logic flow diagram that is illustrative of a method, and execution of a computer program, in accordance with the exemplary embodiments of this invention.

(A) Based on the foregoing it should be apparent that the exemplary embodiments of this invention provide a method, apparatus and computer program product(s) to inform a UE of HARQ-related information. Referring to FIG. 4, at Block 4A the eNB 12 sends the UE 10 a RRC configuration that comprises one or more HARQ process number(s) that indicate(s) semi-persistent scheduling, and at Block 4B, that further comprises at least one of a number of HARQ processes for semi-persistent scheduling and HARQ identifications used for semi-persistent scheduling, or a periodicity pattern per HARQ process.

(B) In the method of paragraph (A), where PDCCH signaling is used to inform the UE 10 of X HARQ processes, where one or more of the values of X indicate(s) semi-persistent HARQ scheduling, and where a number of semi-persistent HARQ processes is given by N and is signaled to the UE 10 via RRC signaling, where one HARQ process ID indicates semi-persistent. In the method a HARQ buffer that indicates semi-persistent is divided into N sub-buffers, and for each semi-persistent HARQ allocation the sub-buffer identification for the transmission of new packets is derived implicitly from a periodicity pattern and a TTI number in accordance with:

sub-buffer=[trunc(current_TTI/SP_period)] mod Number_of_semi-persistent_HARQ.

(C) In the method of paragraph (A), where PDCCH signaling is used to inform the UE 10 of X HARQ processes, where one of the values of X indicates semi-persistent HARQ scheduling, and where a number of semi-persistent HARQ processes is given by N as is signaled to the UE 10 via RRC signaling, where one HARQ process ID indicates semi-persistent. In the method a HARQ buffer is divided to X+N−1 buffers, and if the PDCCH indicates semi-persistent HARQ scheduling via the HARQ process ID, or if semi-persistent allocation is in use, a correct HARQ buffer for the semi-persistent transmissions of new packets is derived by:

HARQ buffer=X−1+[trunc(current_TTI/SP_period)] mod Number_of_semi-persistent_HARQ.

(D) In the method of paragraph (A), where PDCCH signaling is used to inform the UE 10 of X HARQ processes, where a plurality of HARQ processes and HARQ IDs are reserved for semi-persistent HARQ scheduling, where one indicates that semi-persistent HARQ scheduling is in use in an initial allocation. In this method all HARQ IDs form a vector Y of HARQ processes, and a HARQ buffer to be used for a semi-persistent allocation is derived from:

vector_index=[trunc(current_TTI/SP_period)]mod Number_of_semi-persistent_HARQ

HARQ buffer=Y(vector_index).

(E) In the method of paragraph (A), where at least one bit of PDCCH signaling is used to inform the UE 10 of semi-persistent transmission, where a plurality (N) of HARQ buffers are needed for semi-persistent use, and where originally X HARQ buffers exist. In this method the X HARQ buffers are divided into X+N HARQ buffers, and N of these X+N HARQ buffers are reserved for semi-persistent use. In this method, responsive to the at least one bit of PDCCH signaling being on, the UE 10 interprets HARQ bits in the HARQ field of a DL-CCH to indicate in which of the N HARQ buffers a semi-persistent transmission is to be stored. In this method all HARQ IDs form a vector Y of HARQ processes, and a HARQ buffer to be used for a semi-persistent allocation is derived from:

vector_index=[trunc(current_TTI/SP_period)]mod Number_of semi-persistent_HARQ

HARQ buffer=Y(vector_index).

(F) In the method of paragraphs (B)-(E), where the expression: [trunc(current_TTI/SP_period)] is replaced by a value of a counter that is increased according to a periodicity pattern.

(G) In the method of paragraphs (B)-(E), where in response to a re-transmission being needed, the method further includes the use of one of:
(G1) using log 2(Number_of semi-persistent_HARQ processes) bits to indicate the HARQ buffer;
(G2) interpreting unused bits of TFI and/or TBS fields to indicate a correct HARQ buffer/process; or
(G3) when using a PDCCH bit to indicate whether a transmission is semi-persistent, using RV information to determine whether to store semi-persistent information, or whether the allocation is for re-transmission, where in the semi-persistent transmission case the HARQ bits refer to the HARQ buffers reserved for semi-persistent use.

(H) In the method of paragraph (G), when considered with the method of paragraph (D) where in response to a re-transmission being needed, the method may further include the use of: where j-bits are used in the PDCCH for indicating the HARQ buffer, where the Number_of semi-persistent_HARQ processes of all HARQ process IDs can be reserved for semi-persistent use, and where RV indicates the occurrence of the re-transmission, the correct HARQ buffer is identifiable implicitly.

(I) In the method of the preceding paragraphs, where for a case where each semi-persistent allocation is assigned its own HARQ process ID, and each semi-persistent allocation may have its own periodicity, in order to avoid re-transmissions overlapping with a semi-persistent transmission of a new packet, then alternatively more than one semi-persistent allocation is configured, such as two allocations with 40 ms periodicity to effectively create a 20 ms periodicity pattern.

(J) In the method of the preceding paragraphs, where if the PDCCH contains 1 bit to indicate semi-persistent, and originally there are X HARQ processes and N semi-persistent configurations, dividing the UE 10 memory into X+N buffers, and the HARQ buffers for different semi-persistent configurations are derived as in the method of paragraph (E) above, with the exception that N semi-persistent parameters are stored in the memory of the UE 10.

(K) In the method of the preceding paragraphs, where for a case where only one HARQ process ID can be assigned to the semi-persistent allocation, and originally there are X HARQ processes and N semi-persistent configurations, dividing the UE 10 memory into X+N buffers, and the HARQ buffers for different semi-persistent configurations are derived as in the methods of paragraphs (B) or (C), with the exception that in the case of an initial transmission the PDCCH also defines which parameters need to be stored for each separate HARQ process semi-persistent configuration, and where re-transmission is accomplished in accordance with one of the methods of paragraphs (G1), G2) or (H).

(L) Based on the foregoing it should be apparent that the exemplary embodiments of this invention also provide a method, apparatus and computer program product(s) for the UE 10 and for the eNB 12 to determine the HARQ process number (or id) to be assumed for the transmissions sent/received without using associated downlink control signaling, based on at least one of the following:
  system frame number (SFN) or sub-frame number (or equivalently TTI number);
  number of HARQ processes reserved for semi-persistent (or control-less) scheduling (Num_SP_HARQ);
  periodicity of semi-persistent scheduling (SP_Period);
  HARQ process ID indicated for the first allocation.

(M) In the method of paragraph (L), where the number of HARQ processes reserved for semi-persistent (or control-less) scheduling and/or the periodicity of semi-persistent scheduling and/or the HARQ process id(s) reserved for semi-persistent scheduling are signaled on the RRC.

(N) In the method of paragraph (L), where the HARQ process number is determined according to the following formula:

Current_HARQ_ID=Stored_HARQ_ID+[trunc(Current_TTI/SP_Period)] mod Num_SP_HARQ), where Stored_HARQ_ID is the HARQ process number indicated for the first allocation.

(O) In the method of paragraph (N) where the sub-frame (or TTI) number is determined as follows:

Current_TTI=10*SFN+sub-frame_index, where SFN is the system frame number (broadcast in the cell) and sub-frame_index (0,1,2 , . . . ,9) is the index of the sub-frame inside one frame.

The various blocks shown in FIG. 4 may be viewed as method steps, and/or as operations that result from operation of computer program code, and/or as a plurality of coupled logic circuit elements constructed to carry out the associated function(s).

The exemplary embodiments of this invention also encompass hardware/software/firmware circuitry and means located in apparatus, such as the eNB 12 and the UE 10, to accomplish the methods described above, including (but not limited to) the HARQ functional blocks 12F, 10F (and HARQ buffers) and the scheduler 12E of the eNB 12.

Having thus described the various exemplary embodiments of this invention, it may be further noted that there is a problem with talk-spurt based semi-persistent scheduling in that the PDCCH (used for allocating time and frequency resources for semi-persistent use) needs to be reliable. This is especially true if the resources can change during the talk spurt due to error cases. If the UE 10 does not receive the PDCCH, and the eNB 12 makes a DTX to ACK error transition, or DTX to NAK error transition (i.e., the eNB 12 interprets DTX (=no transmission from UE) as a transmitted ACK or NAK), the eNB 12 will assume that the new frequency/time resources and TFI are valid. However, UE 10 will assume that the previous semi-persistent configuration is valid. As retransmissions are sent together with the PDCCH, the UE 10 attempts to combine them with the wrong initial transmission, thus corrupting the associated HARQ buffer.

Assuming that a normal PDCCH error rate is 1%, and that the DTX to ACK or DTX to NAK error rates also 1%, then the probability that the eNB 12 assumes that the semi-persistent allocation was successful, when the UE 10 fails to receive it, is 1e-4. While this may appear to be a relatively low error probability, in that the semi-persistent allocation is intended to be used for a longer period of time than a dynamic allocation, the occurrence of an error can be very detrimental.

In order to improve the reliability of the PDCCH, and thus reduce the probability of reception error by the UE 10, the eNB 12 is configured to transmit the PDCCH for a semi-persistent allocation more than once, and to also allow for possibly different error target (for power balancing) for the semi-persistent PDCCH transmission. More transmission power, and/or more robust coding, may be used when transmitting a PDCCH that contains a semi-persistent allocation It is also possible that network is configured to always transmit the PDCCH for N first semi-persistent allocations, when the allocation is initially given, or if some of the parameters are changed during the talk spurt (instead of only transmitting the semi-persistent allocation once at the beginning of the talk spurt, or during the talk spurt if the semi-persistent allocation needs to be changed, such that the eNB 12 transmits the PDCCH a plurality (N) of times.

A different power target may be set by power offset for the semi-persistent UE's PDCCH. Different aggregation levels may be ensured for semi-persistent UEs 10 if the channel quality indicator (CQI) threshold for the aggregation target is set differently for the semi-persistent UEs 10.

The repetition of the semi-persistent allocation N times may be considered as an implementation issue (where a particular network vendor/operator may decide whether to use it), or it may be specified by standard. In the former case the repetition is preferably fully transparent to the UE 10, i.e., the UE 10 should handle the repeated allocations as normal updates. If the use of the repetition is specified and signaled to the UE 10, then the UE 10 may use soft combining of repeated control messages to further increase reliability.

The same approach may also be used for UL semi-persistent allocations sent in the DL control channel, although the probability that the UE 10 misses the allocation, and this is not detected by the eNB 12, is lower for UL allocations, as it is more readily noticed whether the UE 10 sends the requested data packet or does not send it. That is, the "DTX to data packet" error probability can be expected to be very low.

One clear advantage that is realized by the use of this procedure is that the reliability of the semi-persistent allocation via the DL control channel (PDCCH) is increased.

As such, any of the embodiments of this invention described above with respect to FIG. 4 may be modified to provide for this enhanced reliability in sending the PDCCH to the UEs 10.

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the exemplary embodiments of this invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As such, it should be appreciated that at least some aspects of the exemplary embodiments of the inventions may be practiced in various components such as integrated circuit chips and modules. The design of integrated circuits is by and large a highly automated process. Complex and powerful software tools are available for converting a logic level design into a semiconductor circuit design ready to be fabricated on a semiconductor substrate. Such software tools can automatically route conductors and locate components on a semiconductor substrate using well established rules of design, as well as libraries of pre-stored design modules. Once the design for a semiconductor circuit has been completed, the resultant design, in a standardized electronic format (e.g., Opus, GDSII, or the like) may be transmitted to a semiconductor fabrication facility for fabrication as one or more integrated circuit devices.

Various modifications and adaptations to the foregoing exemplary embodiments of this invention may become apparent to those skilled in the relevant arts in view of the foregoing description, when read in conjunction with the accompanying drawings. However, any and all modifications will still fall within the scope of the non-limiting and exemplary embodiments of this invention.

For example, while the exemplary embodiments have been described above in the context of the E-UTRAN (UTRAN-LTE) system, it should be appreciated that the exemplary embodiments of this invention are not limited for use with only this one particular type of wireless communication system, and that they may be used to advantage in other wireless communication systems.

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples. Furthermore, some of the features of the various non-limiting and exemplary embodiments of this invention may be used to advantage without the corresponding use of other features. As such, the foregoing description should be considered as merely illustrative of the principles, teachings and exemplary embodiments of this invention, and not in limitation thereof.

What is claimed is:

1. A method comprising:
configuring one or more hybrid automatic repeat request process identifications that are to be used for scheduling without associated control signaling; and
determining a particular hybrid automatic repeat request process identification to be assumed for a given subframe, wherein the determining is based on at least one of:
a number of hybrid automatic repeat request processes that are allocated for semi-persistent scheduling; and
a periodicity for semi-persistent scheduling.

2. The method according to claim 1, the method further comprising sending at least one of: an indication of the number of hybrid automatic repeat request processes that are allocated for the semi-persistent scheduling; and an indication of the periodicity for semi-persistent scheduling.

3. The method according to claim 2, wherein the indication is sent via radio resource control signaling and wherein the one or more hybrid automatic repeat request process identifications are to be used for semi-persistent scheduling.

4. The method according to claim 1, wherein the particular hybrid automatic repeat request process identification to be assumed for the given subframe is determined as a function of a number of the given subframe which is derived from the system frame number, the periodicity of semi-persistent scheduling, and the number of hybrid automatic repeat request processes that are allocated for semi-persistent scheduling.

5. The method according to claim 4, wherein the particular hybrid automatic repeat request process identification to be assumed for the given subframe is determined as a function of [Current TTI/SP_Period] mod Num_SP_HARQ:
wherein Current TTI is a number for the given subframe derived from the system frame number and the term [Current TTI/SP_Period] is rounded to an integer prior to the modulo operation; SP_Period is the periodicity of the semi-persistent scheduling; and
Num_SP_HARQ is the number of hybrid automatic repeat request processes that are allocated for semi-persistent scheduling.

6. The method according to claim 1, wherein the determining is based on each of: the system frame number; the number of hybrid automatic repeat request processes that are allocated for semi-persistent scheduling and the periodicity for semi-persistent scheduling;
the method further comprising broadcasting an indication of the system frame number and sending radio resource control signaling that comprises an indication of the number of hybrid automatic repeat request processes that are allocated for semi-persistent scheduling and an indication of the periodicity for semi-persistent scheduling;
and wherein a number for the given subframe is determined as 10*SFN+sub-frame_index;
wherein SFN is the system frame number and sub-frame_index is an index of sub-frame within the frame.

7. The method according to claim 1, executed by an access node of a wireless communication network.

8. An apparatus comprising:
a processor configured to set one or more hybrid automatic repeat request process identifications for scheduling without associated control signaling; and
the processor further configured to determine a particular hybrid automatic repeat request process identification to be assumed for a given subframe, wherein the determining is based on at least one of:
a number of hybrid automatic repeat request processes that are allocated for semi-persistent scheduling; and
a periodicity for semi-persistent scheduling.

9. The apparatus according to claim 8, further comprising a transmitter configured to send to a user equipment at least one of: an indication of the number of hybrid automatic repeat request processes that are allocated for the semi-persistent scheduling; and an indication of the periodicity for semi-persistent scheduling.

10. The apparatus according to claim 8, wherein the transmitter is configured to send the indication via radio resource control signaling and wherein the one or more hybrid automatic repeat request process identifications are to be used for semi-persistent scheduling.

11. The apparatus according to claim 8, further comprising a transmitter configured to transmit in the given subframe data without associated control information.

12. The apparatus according to claim 11, wherein the transmitter is configured to retransmit the data with associated control information indicating the particular hybrid automatic repeat request process identification in response to a negative acknowledgment or a missing acknowledgement.

13. The apparatus according to claim 8, wherein the processor is configured to determine the particular hybrid automatic repeat request process identification to be assumed for the given subframe as a function of the system frame number, the periodicity of semi-persistent scheduling, and the number of hybrid automatic repeat request processes that are allocated for semi-persistent scheduling.

14. The apparatus according to claim 13, wherein the processor is configured to determine the particular hybrid automatic repeat request process identification to be assumed for the given subframe as a function of [Current TTI/SP_Period] mod Num_SP_HARQ, where the term [Current TTI/SP_Period] is rounded to an integer before the modulo operation:
wherein Current TTI is a number for the given subframe which is 10*SFN+sub-frame_index;
wherein SFN is the system frame number; sub-frame_index is an index of sub-frame within the frame; SP_Period is the periodicity of the semi-persistent scheduling; and
Num_SP_HARQ is the number of hybrid automatic repeat request processes that are allocated for semi-persistent scheduling.

15. The apparatus according to claim 8, wherein the processor is configured to determine the particular hybrid automatic repeat request process identification to be assumed for the given subframe based on each of: the system frame number,; the number of hybrid automatic repeat request processes that are allocated for semi-persistent scheduling, and the periodicity for semi-persistent scheduling;
the apparatus further comprising at least one transmitter configured to broadcast an indication of the system frame number and configured to send radio resource control signaling an indication of the number of hybrid automatic repeat request processes that are allocated for semi-persistent scheduling and an indication of the periodicity for semi-persistent scheduling.

16. A non-transitory memory storing a program of computer readable instructions, executtion of which by a processor configures an apparatus to perform actions comprising:
configuring one or more hybrid automatic repeat request process identifications that are to be used for scheduling without associated control signaling; and
determining a particular hybrid automatic repeat request process identification to be assumed for a given subframe, wherein the determining is based on at least one of:
a number of hybrid automatic repeat request processes that are allocated for semi-persistent scheduling; and
a periodicity for semi-persistent scheduling.

17. The memory of claim 16, wherein the particular hybrid automatic repeat request process identification to be assumed for the given subframe is determined as a function of [Current TTI/SP_Period] mod Num_SP_HARQ where the term [Current TTI/SP_Period] is rounded to an integer before the modulo operation:
wherein Current TTI is a number for the given subframe determined as 10*SFN+sub-frame_index; wherein SFN is the system frame number and sub-frame_index is an index of sub-frame within the frame;
SP_Period is the periodicity of the semi-persistent scheduling; and
Num_SP_HARQ is the number of hybrid automatic repeat request processes that are allocated for semi-persistent scheduling.

18. A method comprising:
receiving data without associated control signaling; and
determining a particular hybrid automatic repeat request process identification for the received data, wherein the determining is based on at least one of:
a number of hybrid automatic repeat request processes that are allocated for semi-persistent scheduling; and
a periodicity for semi-persistent scheduling.

19. The method according to claim 18, the method further comprising receiving an indication of at least one of the number of hybrid automatic repeat request processes that are allocated for the semi-persistent scheduling and the periodicity for semi-persistent scheduling.

20. The method according to claim 18, wherein the particular hybrid automatic repeat request process identification for the received data is determined as a function of the system frame number, the periodicity of semi-persistent scheduling, and the number of hybrid automatic repeat request processes that are allocated for semi-persistent scheduling.

21. The method according to claim 20, wherein the particular hybrid automatic repeat request process identification for the received data is determined as a function of [Current TTI/SP_Period] mod Num_SP_HARQ where the term [Current TTI/SP_Period] is rounded to an integer before the modulo operation:
wherein Current TTI is a number for a subframe in which the data was received and which is 10*SFN+sub-frame_index; wherein SFN is the system frame number; sub-frame_index is an index of sub-frame within the frame; SP_Period is the periodicity of the semi-persistent scheduling; and Num_SP_HARQ is the number of hybrid automatic repeat request processes that are allocated for semi-persistent scheduling.

22. The method according to claim 18, wherein the determining is based on each of: the system frame number, the number of hybrid automatic repeat request processes that are allocated for semi-persistent scheduling and the periodicity for semi-persistent scheduling;
the method further comprising receiving a broadcast indication of the system frame number, and receiving via radio resource control signaling an indication of the number of hybrid automatic repeat request processes that are allocated for semi-persistent scheduling and an indication of the periodicity for semi-persistent scheduling.

23. The method according to claim 18, executed by a user equipment.

24. The method according to claim 18, wherein the number of hybrid automatic repeat request processes that are allocated for semi-persistent scheduling is one; the method further comprising storing the received data in a sub-buffer of a hybrid automatic repeat request buffer for semi-persistent scheduling and identifying the sub-buffer from the system frame number.

25. The method according to claim 18, where there the number of hybrid automatic repeat request processes that are allocated for semi-persistent scheduling is an integer N that is less than an integer X;
the method further comprising dividing a buffer space into N+X sub-buffers of which N of the sub-buffers are for semi-persistent scheduling, storing the received data in one of the N sub-buffers and identifying the one sub-buffer from the system frame number.

26. An apparatus comprising:
a buffer configured to store data that is received without associated control signaling; and
a processor configured to determine a particular hybrid automatic repeat request process identification for the received data based on at least one of:
a number of hybrid automatic repeat request processes that are allocated for semi-persistent scheduling; and
a periodicity for semi-persistent scheduling.

27. The apparatus according to claim 26, further comprising a receiver configured to receive the data without associated control signaling, and for the case that the data without associated control signaling is not correctly received, to store the data in the buffer which is indicated by the determined hybrid automatic repeat request process identification.

28. The apparatus according to claim 27, wherein the receiver is configured to receive a retransmission of the data, with associated control signaling indicating the particular hybrid automatic repeat request process identification, and further configured to combine the retransmitted data into the buffer which is indicated by the particular hybrid automatic repeat request process identification.

29. The apparatus according to claim 26, further comprising a receiver configured to receive the data, and to receive via radio resource control signaling an indication of at least one of the number of hybrid automatic repeat request processes that are allocated for the semi-persistent scheduling and an indication of the periodicity for semi-persistent scheduling.

30. The apparatus according to claim 29, wherein the processor is configured to determine the particular hybrid automatic repeat request process identification for the data as a function of the system frame number, the periodicity of semi-persistent scheduling, and the number of hybrid automatic repeat request processes that are allocated for semi-persistent scheduling.

31. The apparatus according to claim 30, wherein the processor is configured to determine the particular hybrid automatic repeat request process identification for the received data as a function of [Current TTI/SP_Period] mod Num_SP_HARQ where the term [Current TTI/SP_Period] is rounded to an integer before the modulo operation:

wherein Current TTI is a number for a subframe in which the data was received and which is 10*SFN+sub-frame_index; wherein SFN is the system frame number; sub-frame_index is an index of sub-frame within the frame; SP_Period is the periodicity of the semi-persistent scheduling; and Num_SP_HARQ is the number of hybrid automatic repeat request processes that are allocated for semi-persistent scheduling.

32. The apparatus according to claim 26, wherein the processor is configured to determine the particular hybrid automatic repeat request process identification for the received data based on each of: the system frame number, the number of hybrid automatic repeat request processes that are allocated for semi-persistent scheduling and the periodicity for semi-persistent scheduling;

the apparatus further comprising a receiver configured to receive a broadcast indication of the system frame number, and configured to receive via radio resource control signaling an indication of the number of hybrid automatic repeat request processes that are allocated for semi-persistent scheduling and an indication of the periodicity for semi-persistent scheduling.

33. The apparatus according to claim 26, wherein the number of hybrid automatic repeat request processes that are allocated for semi-persistent scheduling is one;

the buffer comprising sub-buffers of a hybrid automatic repeat request buffer for semi-persistent scheduling;

and wherein the processor is configured to identifying the sub-buffer in which the received data is stored from the system frame number.

34. The method of claim 26, where there the number of hybrid automatic repeat request processes that are allocated for semi-persistent scheduling is an integer N that is less than an integer X;

the processor is configured to divide a buffer space into N+X sub-buffers of which N of the sub-buffers are for semi-persistent scheduling, the buffer in which the data is received is one of the N sub-buffers, and the processor is configured to identify the sub-buffer in which the data is stored from the system frame number.

35. A non-transitory memory storing a program of computer readable instructions, executtion of which by a processor configure an apparatus to perform actions comprising:

receiving data without associated control signaling; and determining a particular hybrid automatic repeat request process identification for the received data, wherein the determining is based on at least one of:

a number of hybrid automatic repeat request processes that are allocated for semi-persistent scheduling; and a periodicity for semi-persistent scheduling.

36. The memory of claim 35, wherein the particular hybrid automatic repeat request process identification for the received data is determined as a function of [Current TTI/SP_Period] mod Num_SP_HARQ where the term [Current TTI/SP_Period] is rounded to an integer before the modulo operation:

wherein Current TTI is a number for a subframe in which the data was received and which is 10*SFN+sub-frame_index; wherein SFN is the system frame number and sub-frame_index is an index of sub-frame within the frame;

SP_Period is the periodicity of the semi-persistent scheduling; and

Num_SP_HARQ is the number of hybrid automatic repeat request processes that are allocated for semi-persistent scheduling.

* * * * *

UNITED STATES PATENT AND TRADEMARK OFFICE
CERTIFICATE OF CORRECTION

PATENT NO.         : 8,320,341 B2
APPLICATION NO.    : 12/288786
DATED              : November 27, 2012
INVENTOR(S)        : Malkamaki et al.

It is certified that error appears in the above-identified patent and that said Letters Patent is hereby corrected as shown below:

Claim 16, col. 19, line 2 delete "executtion" and insert --execution--.

Claim 35, col. 22, line 9 delete "executtion" and insert --execution--.

Claim 35, col. 22, line 10 delete "configure" and insert --configures--.

Signed and Sealed this
Second Day of April, 2013

Teresa Stanek Rea
*Acting Director of the United States Patent and Trademark Office*